US010380040B2

(12) United States Patent
Tavva et al.

(10) Patent No.: US 10,380,040 B2
(45) Date of Patent: Aug. 13, 2019

(54) MEMORY REQUEST SCHEDULING TO IMPROVE BANK GROUP UTILIZATION

(71) Applicant: International Business Machines Corporation, Armonk, NY (US)

(72) Inventors: Venkata K. Tavva, Hyderabad (IN); Dharmesh Parikh, Bangalore (IN); Stephen J. Powell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/791,766

(22) Filed: Oct. 24, 2017

(65) Prior Publication Data
US 2019/0121565 A1     Apr. 25, 2019

(51) Int. Cl.
*G06F 12/00* (2006.01)
*G06F 13/16* (2006.01)
*G06F 3/06* (2006.01)

(52) U.S. Cl.
CPC ........ *G06F 13/1605* (2013.01); *G06F 3/0604* (2013.01); *G06F 3/0644* (2013.01); *G06F 3/0673* (2013.01)

(58) Field of Classification Search
None
See application file for complete search history.

(56) References Cited

U.S. PATENT DOCUMENTS

| 2011/0238934 | A1* | 9/2011 | Xu ................ G06F 13/1689 711/158 |
| 2014/0101380 | A1 | 4/2014 | Svendsen |
| 2016/0342539 | A1* | 11/2016 | Bains ................ G06F 13/16 |
| 2016/0365131 | A1* | 12/2016 | Kim .................... G11C 7/22 |
| 2016/0378366 | A1 | 12/2016 | Tomishima et al. |

* cited by examiner

Primary Examiner — Daniel D Tsui
(74) Attorney, Agent, or Firm — David M. Quinn

(57) ABSTRACT

Scheduling memory operations using bank groups including receiving, by a sequencing engine in a memory controller, a set of operations targeting locations in a memory device, wherein the memory device comprises a plurality of bank groups; determining, by the sequencing engine, a targeted bank group of each of the set of operations; selecting, by the sequencing engine, one of the set of operations based on the targeted bank group of each of the set of operations and a bank group of a previously sent operation; and sending, by the sequencing engine, the selected one of the set of operations to the memory device.

17 Claims, 8 Drawing Sheets

US 10,380,040 B2

MEMORY REQUEST SCHEDULING TO IMPROVE BANK GROUP UTILIZATION

BACKGROUND

Field of the Invention

The field of the invention is data processing, or, more specifically, methods, apparatus, and products for scheduling memory operations using bank groups.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Methods, systems, and apparatus for scheduling memory operations using bank groups are disclosed in this specification. Scheduling memory operations using bank groups includes receiving, by a sequencing engine in a memory controller, a set of operations targeting locations in a memory device, wherein the memory device comprises a plurality of bank groups; determining, by the sequencing engine, a targeted bank group of each of the set of operations; selecting, by the sequencing engine, one of the set of operations based on the targeted bank group of each of the set of operations and a bank group of a previously sent operation; and sending, by the sequencing engine, the selected one of the set of operations to the memory device.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
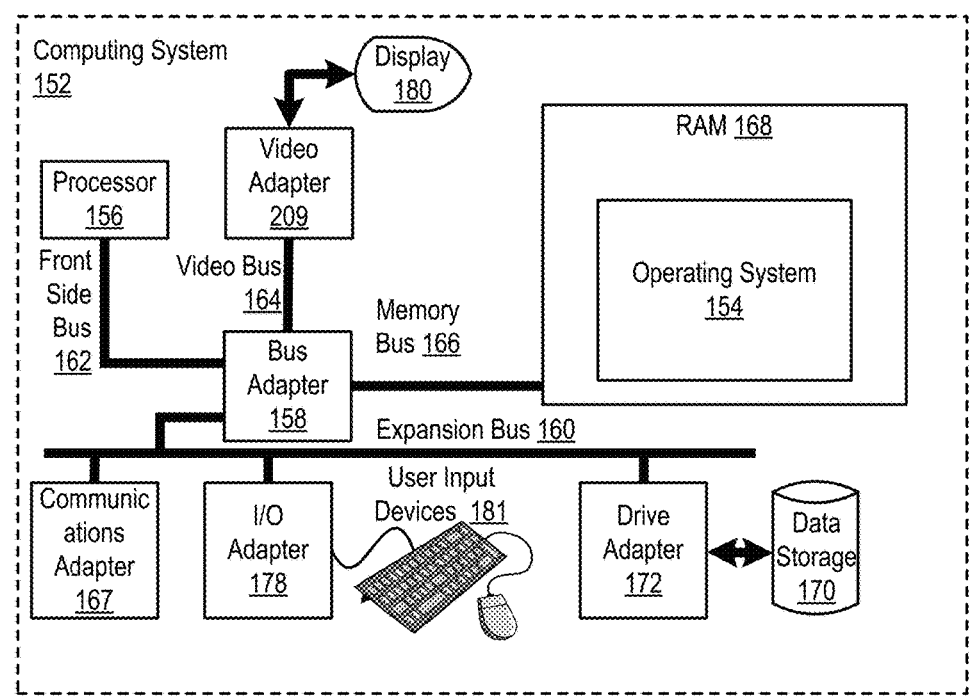
FIG. 1 sets forth a block diagram of an example system configured for scheduling memory operations using bank groups according to embodiments of the present invention.

Exemplary methods, apparatus, and products for scheduling memory operations using bank groups in accordance with the present invention are described with reference to the accompanying drawings, beginning with FIG. 1. FIG. 1 sets forth a block diagram of automated computing machinery comprising an exemplary computing system (152) configured for scheduling memory operations using bank groups according to embodiments of the present invention. The computing system (152) of FIG. 1 includes at least one computer processor (156) or 'CPU' as well as random access memory (168) ('RAM') which is connected through a high speed memory bus (166) and bus adapter (158) to processor (156) and to other components of the computing system (152).

Stored in RAM (168) is an operating system (154). Operating systems useful in computers configured for scheduling memory operations using bank groups according to embodiments of the present invention include UNIX™, Linux™, Microsoft Windows™, AIX™ IBM's i OS™, and others as will occur to those of skill in the art. The operating system (154) in the example of FIG. 1 is shown in RAM (168), but many components of such software typically are stored in non-volatile memory also, such as, for example, on a disk drive (170).

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of data storage (170). Disk drive adapters useful in computers configured for scheduling memory operations using bank groups according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for scheduling memory operations using bank groups according to embodiments of the present invention include modems for wired dial-up communications, Ethernet (IEEE 802.3) adapters for wired data communications, and 802.11 adapters for wireless data communications.

Figure 2:
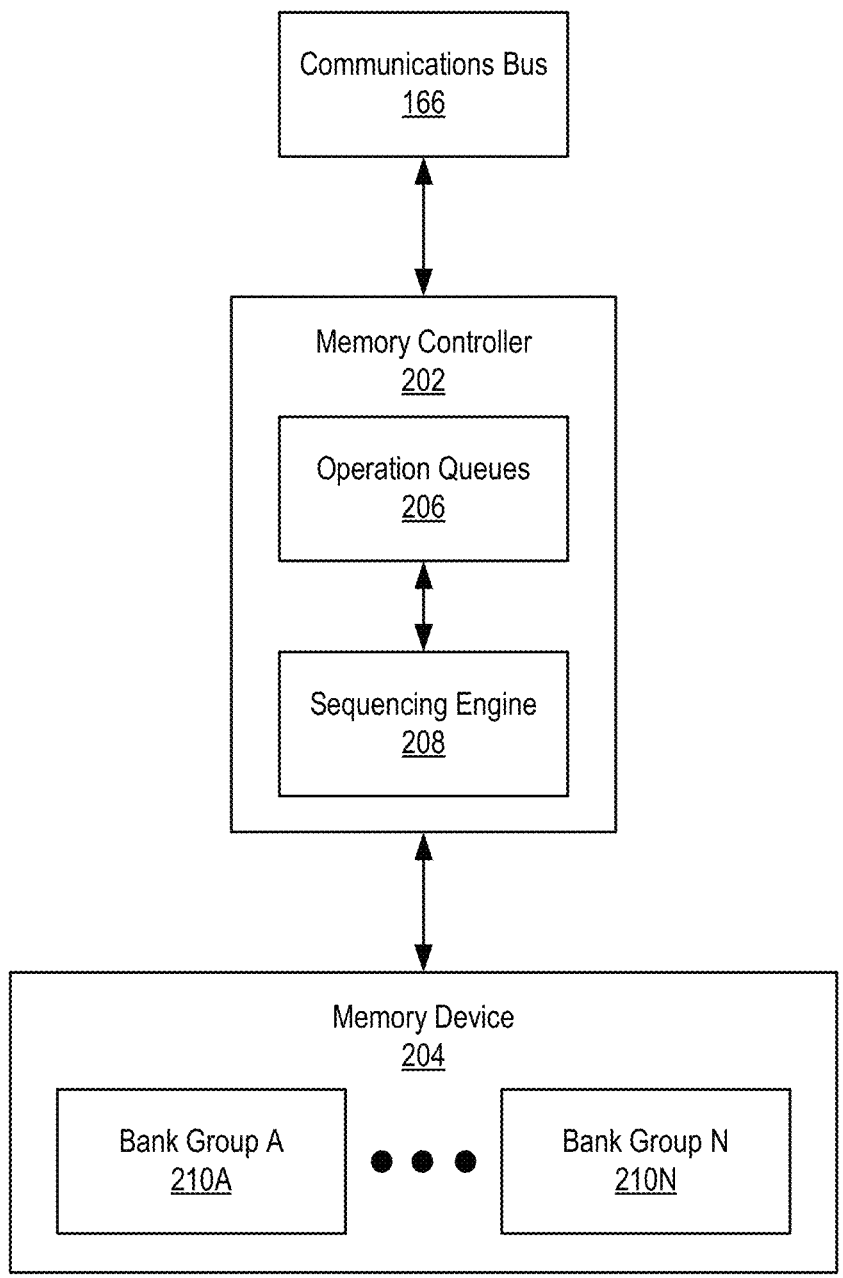
FIG. 2 sets forth a block diagram of an example system configured for scheduling memory operations using bank groups according to embodiments of the present invention.

FIG. 2 shows an exemplary system for scheduling memory operations using bank groups according to embodiments of the present invention. As shown in FIG. 2, the exemplary system includes a communications bus (166), a memory controller (202), and a memory device (204). The memory controller (202) includes operation queues (206) and a sequencing engine (208). The memory device (204) includes multiple bank groups (bank group A (210A), bank group N (210N)).

The communications bus (166) is a transmission medium over which memory operations are received by the memory controller (202). The communications bus (166) may be a high speed memory bus as described in FIG. 1, such as an interconnect bus.

The memory controller (202) is hardware, software, or an aggregation of hardware and software that takes operations from the communications bus (166) and sends the operations to the memory device (204). The operation queues (206) are temporary storage locations for incoming operations targeting the memory device. The operations queues (206) may include a write queue, a read queue, and a command queue. An operation is an access request to read from, write to, or perform an activity on a portion of the memory device (204). Each operation may include an identifier of a location within the memory device (204).

The sequencing engine (208) is hardware, software, or an aggregation of hardware and software that organizes and schedules operations from the operation queues (206) and sends the operations to the memory device (204). The sequencing engine (208) may track attributes of the previously sent operations and select a next operation to send to the memory device (204) based on the attributes of the previously sent operation or operations. The sequencing engine (208) may also select a next operation to send to the memory device (204) based on various timing parameters applicable to the previously sent operation and the set of operations in the operation queues (206).

The memory device (204) is a hierarchy of hardware used to store data on a computing system. The memory device (204) may be a dual in-line memory module that includes one or more ranks, and each rank may include multiple dynamic random-access memory chips. Each dynamic random-access memory chip may include multiple bank groups (bank group A (210A), bank group N (210N)), and each bank group may include multiple banks. A bank is a collection of bit storage circuits organized into columns and rows, and multiple banks are organized into bank groups (bank group A (210A), bank group N (210N)). The memory device (204) may be, for example, a double data rate fourth-generation (or later) synchronous dynamic random-access memory device. The memory device (204) and the memory controller (202) may be elements within the RAM (168) element described in FIG. 1.

Two consecutive operations sent to the memory device (204) via the sequencing engine (208) may be subject to various timing parameters based on the bank group or groups targeted by the operations. For example, two row activation operations may be subject to a row activation to row activation delay. Two row activation operations sent to different bank groups may be subject to a short delay (e.g., 4 cycles), while two row activation operations sent to the same bank group may be subject to a long delay (e.g., 6 cycles). As another example, a write column-access-strobe (CAS) operation and a read CAS operation may be subject to a write CAS to read CAS turn around time. If the write CAS operation and read CAS operation target different bank groups, the turn around time may be short (e.g., 3 cycles). If the write CAS operation and read CAS operation target the same bank group, the turn around time may be a longer (e.g., 9 cycles). Finally, two CAS operations may be subject to a CAS to CAS delay. Two CAS operations sent to different bank groups may be subject to a short delay (e.g., 4 cycles), while two CAS operations sent to the same bank group may be subject to a long delay (e.g., 6 cycles).

Figure 3:
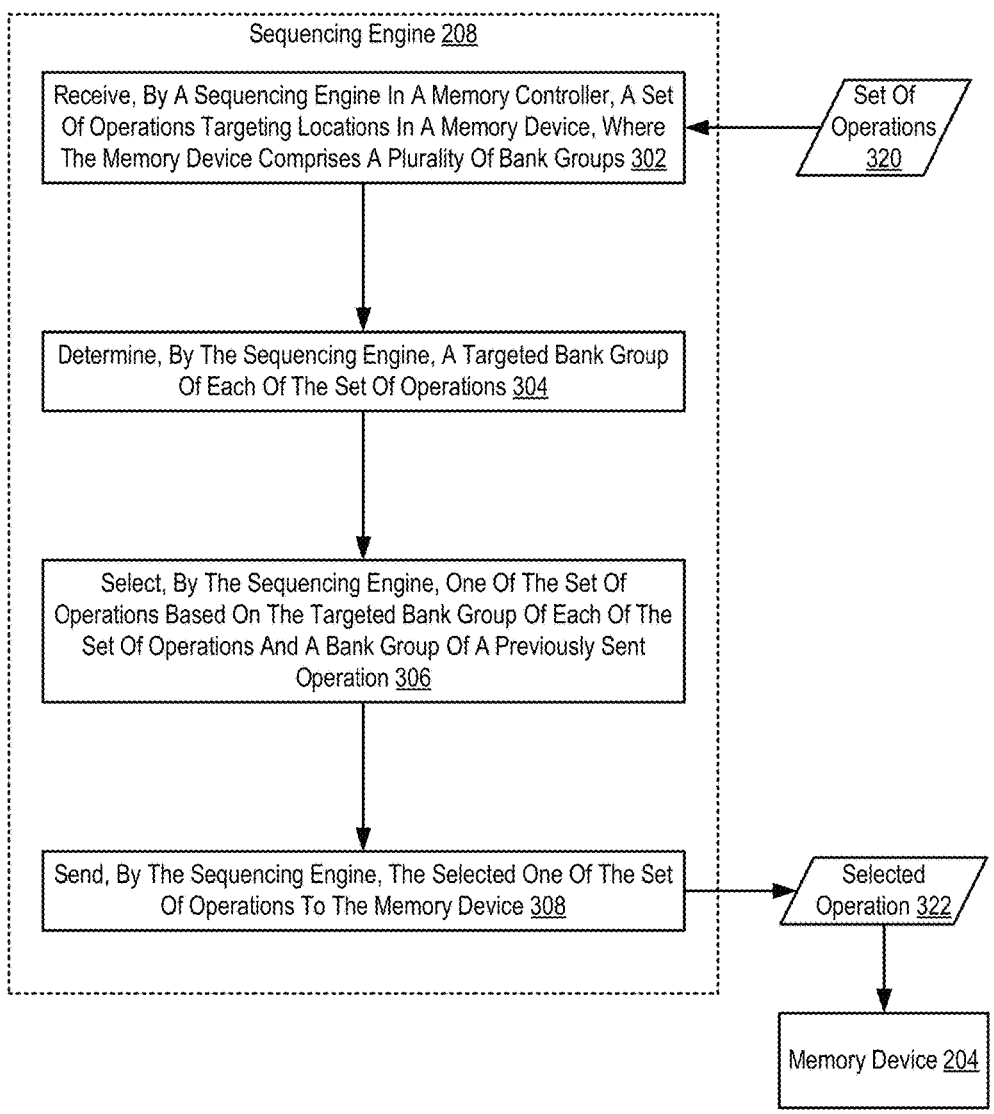
FIG. 3 sets forth a flow chart illustrating an exemplary method for scheduling memory operations using bank groups according to embodiments of the present invention.

For further explanation, FIG. 3 sets forth a flow chart illustrating an exemplary method for scheduling memory operations using bank groups according to embodiments of the present invention that includes receiving (302), by a sequencing engine (208) in a memory controller, a set of operations (320) targeting locations in a memory device (204), wherein the memory device (204) comprises a plurality of bank groups. Receiving (302), by a sequencing engine (208) in a memory controller, a set of operations (320) targeting locations in a memory device (204), wherein the memory device (204) comprises a plurality of bank groups may be carried out by the sequencing engine (208) receiving a notification that the set of operations is stored in the operation queues. The set of operations are operations among which the sequencing engine (208) may select for the next transmission to the memory device. The sequencing engine (208) may receive for evaluation operations from one queue or from multiple queues.

The method of FIG. 3 further includes determining (304), by the sequencing engine (208), a targeted bank group of each of the set of operations (320). Determining (304), by the sequencing engine (208), a targeted bank group of each of the set of operations (320) may be carried out by evaluating a portion of each operation that includes a bank group identifier. The bank group identifier may be part of a larger location address in the memory device (204) that includes a rank, chip, and bank identifiers.

The set of operations may refer to the group of operations tested by the sequencing engine (208) until an operation that matches the criteria for sending to the memory device (204) is selected. The sequencing engine (208) may determine the targeted bank group for each operation until the sequencing engine (208) finds an operation with a targeted bank group that matches the criteria for sending to the memory device (204). If the first operation evaluated matches the criteria for sending to the memory device (204), the set of operations may include only that operation.

The method of FIG. 3 further includes selecting (306), by the sequencing engine (208), one of the set of operations based on the targeted bank group of each of the set of operations and a bank group of a previously sent operation. Selecting (306), by the sequencing engine (208), one of the set of operations based on the targeted bank group of each of the set of operations and a bank group of a previously sent operation may be carried out by comparing the bank group identifier of the previously sent operation and the bank group identifier in each of the operations in the set of operations. The previously sent operation may be an operation that immediately precedes the operation being selected from the set of operations.

Selecting (306), by the sequencing engine (208), one of the set of operations for sending to the memory device (204) may be carried out based on a bank group selection policy. FIGS. 4, 5, 6, and 7 each describe different policies by which an operation may be selected for sending to the memory device (204).

The method of FIG. 3 further includes sending (308), by the sequencing engine (208), the selected one of the set of operations (322) to the memory device (204). Sending (308), by the sequencing engine (208), the selected one of the set of operations (322) to the memory device (204) may be carried out by the sequencing engine (208) forwarding the selected operation to the portion of the memory device (204) targeted by the operation. The sequencing engine (208) may send the operation to the memory device (204) using the location address embedded in the operation. Once an operation is selected and sent to the memory device (204), the sequencing engine (208) may then repeat steps 304, 306, and 308 using the operation sent to the memory device (204) as the previously sent operation.

Figure 4:
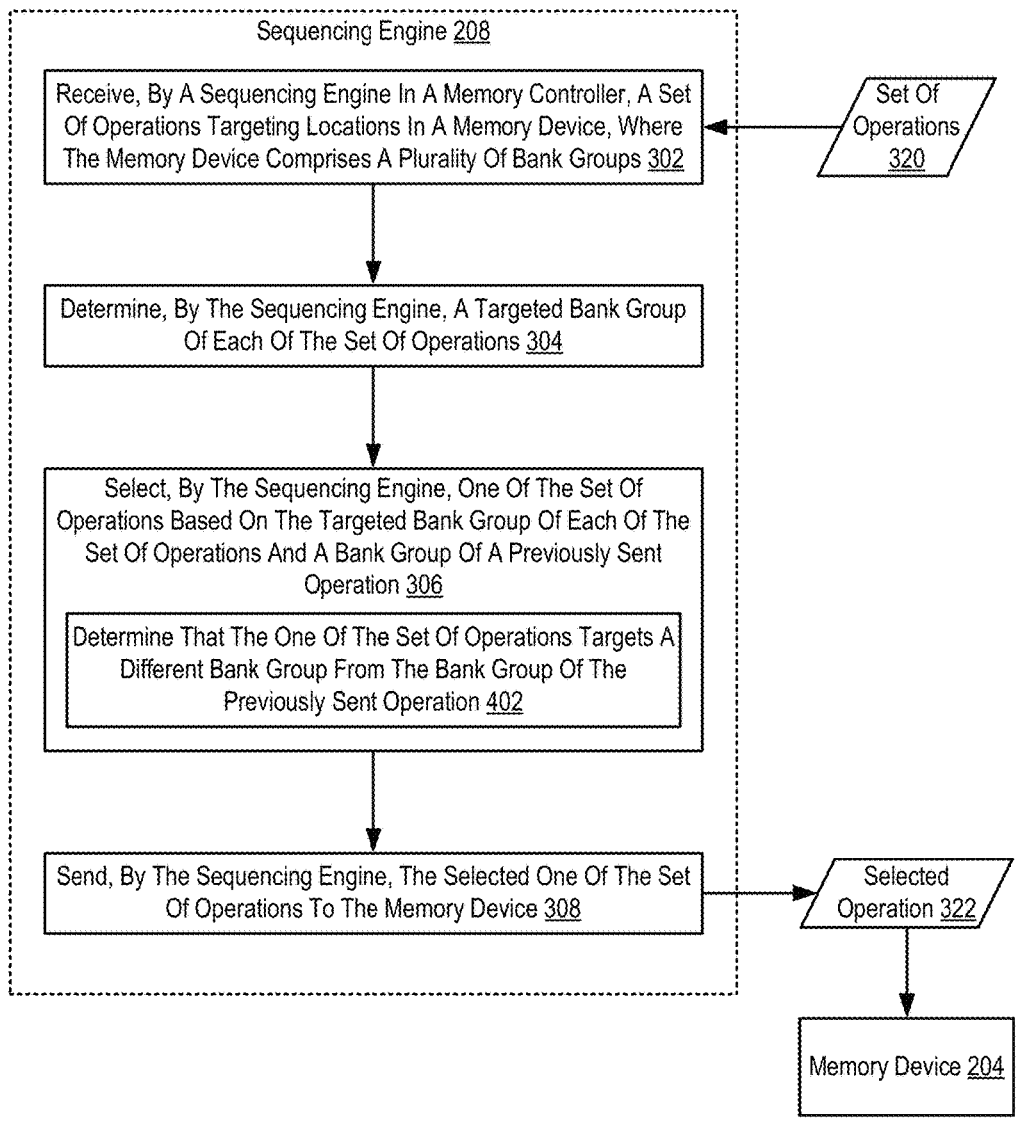
FIG. 4 sets forth a flow chart illustrating an exemplary method for scheduling memory operations using bank groups according to embodiments of the present invention.

For further explanation, FIG. 4 sets forth a flow chart illustrating a further exemplary method for scheduling memory operations using bank groups according to embodiments of the present invention that includes receiving (302), by a sequencing engine (208) in a memory controller, a set of operations (320) targeting locations in a memory device (204), wherein the memory device (204) comprises a plurality of bank groups; determining (304), by the sequencing engine (208), a targeted bank group of each of the set of operations (320); selecting (306), by the sequencing engine (208), one of the set of operations based on the targeted bank group of each of the set of operations and a bank group of a previously sent operation; and sending (308), by the sequencing engine (208), the selected one of the set of operations (322) to the memory device (204).

The method of FIG. 4 differs from the method of FIG. 3, however, in that selecting (306), by the sequencing engine (208), one of the set of operations based on the targeted bank group of each of the set of operations and a bank group of a previously sent operation includes determining (402) that the one of the set of operations targets a different bank group from the bank group of the previously sent operation. Determining (402) that the one of the set of operations targets a different bank group from the bank group of the previously sent operation may be carried out by comparing the bank group identifier of the previously sent operation to the bank group identifier of the received operations. Once the sequencing engine (208) accesses an operation with a bank group identifier that does not match the bank group identifier of the previously sent operation, then that operation is selected for sending to the memory device (204).

For example, the sequencing engine (208) may store the bank group identifier of the previously sent operation in a location (e.g. a storage registers) in the memory controller. Once the sequencing engine (208) receives the set of operations for the current scheduling decision, the sequencing engine (208) may then prefer an operation targeting a bank group that is different than the bank group identifier stored in the location in the memory controller. Specifically, the sequencing engine (208) may compare the bank group identifier of an operation in the set of operations to the bank group identifier stored in the location in the memory controller. If the bank group identifiers do not match, then that operation is selected for sending to the memory device (204). If no operation in the set of operations targets a bank group that is different from the bank group identifier stored in the location in the memory controller, the sequencing engine (208) may select the first operation in the set of operations or the oldest operation in the set of operations.

Figure 5:
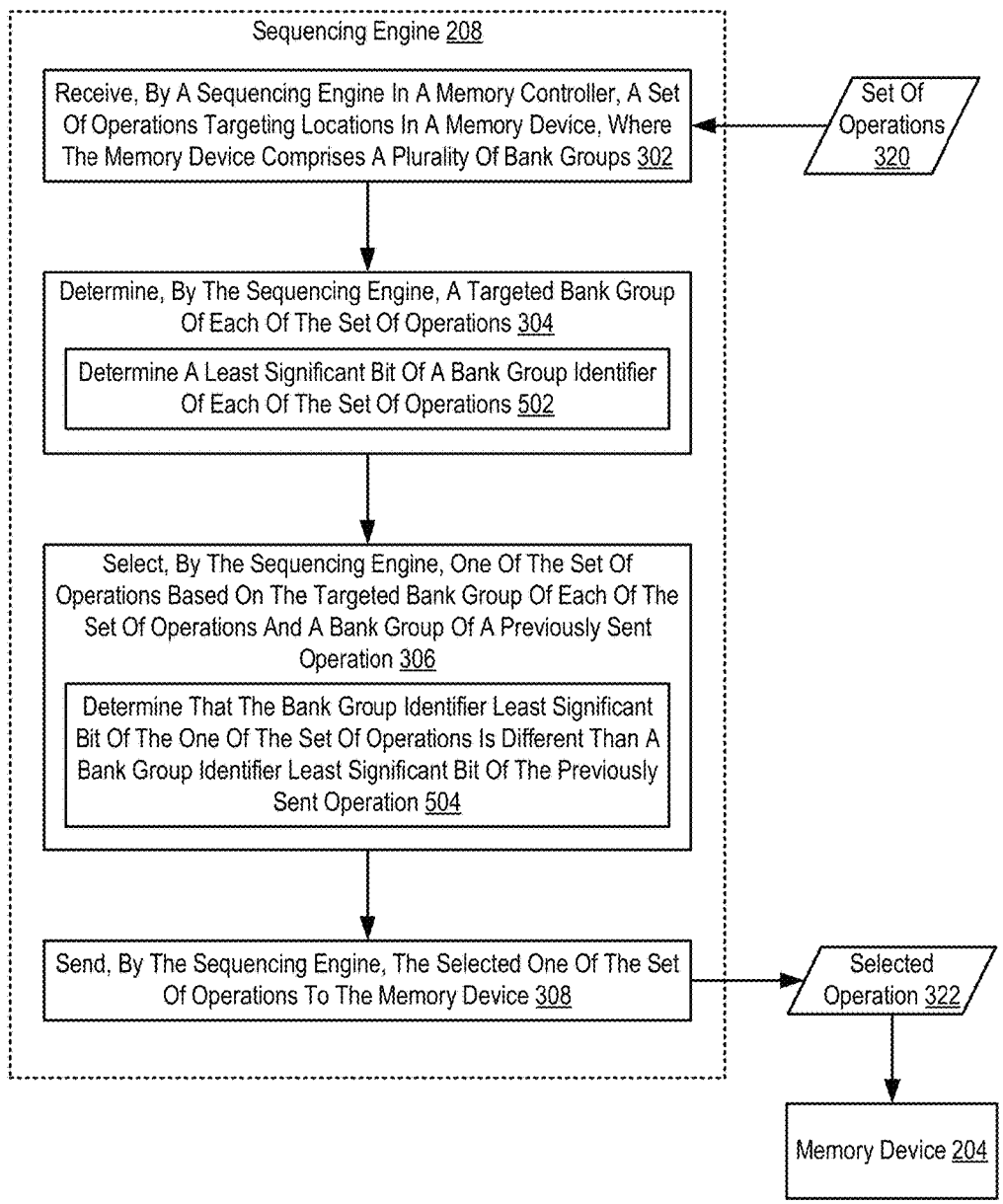
FIG. 5 sets forth a flow chart illustrating an exemplary method for scheduling memory operations using bank groups according to embodiments of the present invention.

For further explanation, FIG. 5 sets forth a flow chart illustrating a further exemplary method for scheduling memory operations using bank groups according to embodiments of the present invention that includes receiving (302), by a sequencing engine (208) in a memory controller, a set of operations (320) targeting locations in a memory device (204), wherein the memory device (204) comprises a plurality of bank groups; determining (304), by the sequencing engine (208), a targeted bank group of each of the set of operations (320); selecting (306), by the sequencing engine (208), one of the set of operations based on the targeted bank group of each of the set of operations and a bank group of a previously sent operation; and sending (308), by the sequencing engine (208), the selected one of the set of operations (322) to the memory device (204).

The method of FIG. 5 differs from the method of FIG. 3, however, in that determining (304), by the sequencing engine (208), a targeted bank group of each of the set of operations (320) includes determining (502) a least significant bit of a bank group identifier of each of the set of operations. Determining (502) a least significant bit of a bank group identifier of each of the set of operations may be carried out by inspecting a particular bit within each operation of the set of operations. The sequencing engine (208) may categorize each operation based on the least significant bit. For example, each operation in the set of operations may be categorized as in an even group (e.g., if the least significant bit is '0') or an odd group (e.g., if the least significant bit is '1').

The method of FIG. 5 also differs from the method of FIG. 3 in that selecting (306), by the sequencing engine (208), one of the set of operations based on the targeted bank group of each of the set of operations and a bank group of a previously sent operation includes determining (504) that the bank group identifier least significant bit of the one of the set of operations is different than a bank group identifier least significant bit of the previously sent operation. Determining (504) that the bank group identifier least significant bit of the one of the set of operations is different than a bank group identifier least significant bit of the previously sent operation may be carried out by comparing the least significant bit of the bank group identifiers of one or more of the operations in the set of operations to the corresponding particular bit within the bank group identifier of the previously sent operation. The sequencing engine (208) may select an operation with a least significant bit that does not match the least significant bit of the previously sent operation.

For example, assume each operation targets one of four bank groups identified as '00', '01', '10', and '11'. The sequencing engine may evaluate each operation to determine if the least significant bit of the bank group identifier places that operation in an even group (e.g., if the least significant bit is '0') or an odd group (e.g., if the least significant bit is '1'). Therefore, each operation targeting either bank group '00' or bank group '10' is determined to be in the even group, and each operation targeting either bank group '01' or bank group '11' is determined to be in the odd group. Further, the sequencing engine (208) may store the least significant bit of the bank group of the previously sent operation in a location in the memory controller.

Continuing with the example, the sequencing engine (208) may select an operation from the even group if the previously sent operation belonged to the odd group. Similarly, the sequencing engine (208) may select an operation from the odd group if the previously sent operation belonged to the even group. If the current set of operations does not include an operation from a different group from the previously sent operation, then the oldest operation may be selected.

Figure 6:
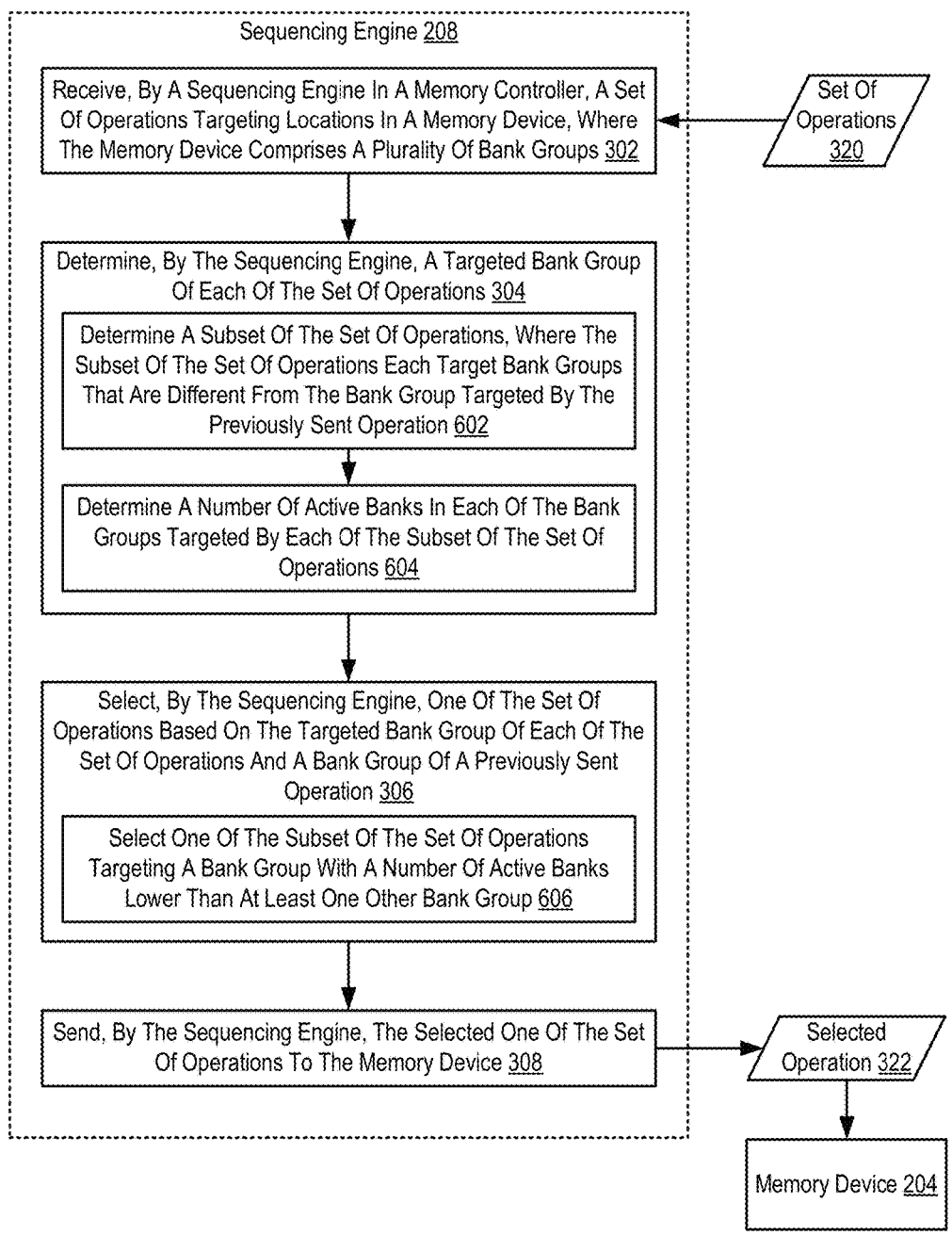
FIG. 6 sets forth a flow chart illustrating an exemplary method for scheduling memory operations using bank groups according to embodiments of the present invention.

For further explanation, FIG. 6 sets forth a flow chart illustrating a further exemplary method for scheduling memory operations using bank groups according to embodiments of the present invention that includes receiving (302), by a sequencing engine (208) in a memory controller, a set of operations (320) targeting locations in a memory device (204), wherein the memory device (204) comprises a plurality of bank groups; determining (304), by the sequencing engine (208), a targeted bank group of each of the set of operations (320); selecting (306), by the sequencing engine (208), one of the set of operations based on the targeted bank group of each of the set of operations and a bank group of a previously sent operation; and sending (308), by the sequencing engine (208), the selected one of the set of operations (322) to the memory device (204).

The method of FIG. 6 differs from the method of FIG. 3, however, in that determining (304), by the sequencing engine (208), a targeted bank group of each of the set of operations (320) includes determining (602) a subset of the set of operations, wherein the subset of the set of operations each target bank groups that are different from the bank group targeted by the previously sent operation; and determining (604) a number of active banks in each of the bank groups targeted by each of the subset of the set of operations.

Determining (602) a subset of the set of operations, wherein the subset of the set of operations each target bank groups that are different from the bank group targeted by the previously sent operation may be carried out by evaluating each bank group identifier in the set of operations and comparing part or all of the bank group identifier to the bank group identifier of the previously sent operation. The subset of the set of operations is created from the operations in the set of operations with bank group identifiers that do not match the bank group identifier of the previously sent operation.

Determining (604) a number of active banks in each of the bank groups targeted by each of the subset of the set of operations may be carried out by the sequencing engine (208) storing the number of active banks for each bank group in a location on the memory controller. The sequencing engine (208) may retrieve information from the memory device (204) about the number of active banks in each bank group. Alternatively, the sequencing engine (208) may track the banks targeted by the operations sent to each bank group and the type of operations sent to each bank and bank group. The sequencing engine (208) may then store information about the number of active banks in each bank group based on the operations sent to the memory device (204).

The method of FIG. 6 also differs from the method of FIG. 3 in that selecting (306), by the sequencing engine (208), one of the set of operations based on the targeted bank group of each of the set of operations and a bank group of a previously sent operation includes selecting (606) one of the subset of the set of operations targeting a bank group with a number of active banks lower than at least one other bank group. Selecting (606) one of the subset of the set of operations targeting a bank group with a number of active banks lower than at least one other bank group may be carried out by comparing the active banks of each of the subset of operations. The sequencing engine (208) may then determine which operations in the subset of operations target bank groups with a low number of active banks relative to the other bank groups targeted by the other operations. The sequencing engine (208) may then select an operation that targets a bank group with the lowest number of active banks, or a number of active banks that is lower than at least one other targeted bank group.

For example, assume that the sequencing engine (208) tracks the number of active banks in each bank group, and stores the information in a register on the memory controller. During the current scheduling decision, the sequencing engine (208) may select an operation targeting the bank group with the least number of active banks. If there are more than one bank groups with the least number of active banks, the sequencing engine (208) may select the oldest operation targeting a bank group with the least number of active banks.

Figure 7:
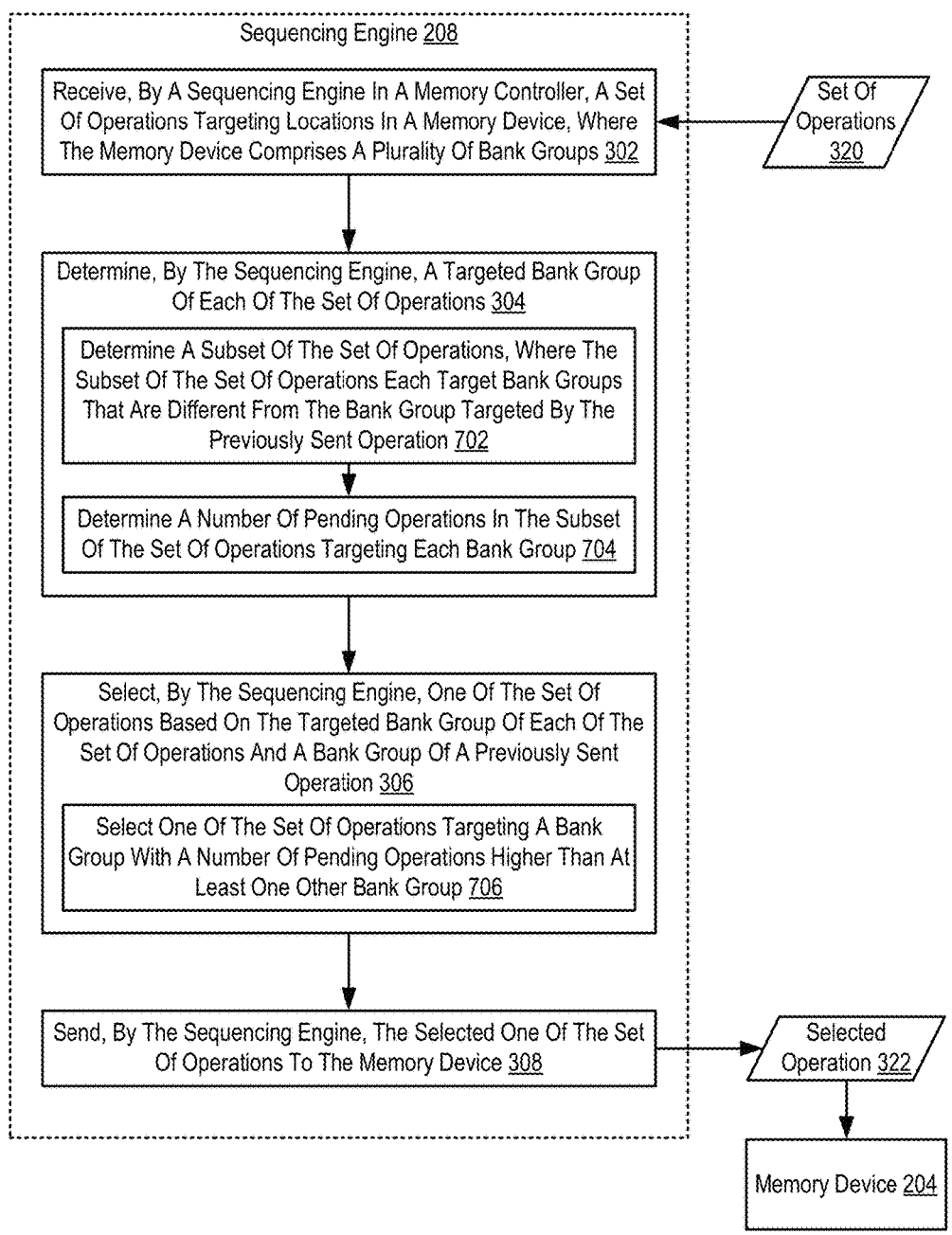
FIG. 7 sets forth a flow chart illustrating an exemplary method for scheduling memory operations using bank groups according to embodiments of the present invention.

For further explanation, FIG. 7 sets forth a flow chart illustrating a further exemplary method for scheduling memory operations using bank groups according to embodiments of the present invention that includes receiving (302), by a sequencing engine (208) in a memory controller, a set of operations (320) targeting locations in a memory device (204), wherein the memory device (204) comprises a plurality of bank groups; determining (304), by the sequencing engine (208), a targeted bank group of each of the set of operations (320); selecting (306), by the sequencing engine (208), one of the set of operations based on the targeted bank group of each of the set of operations and a bank group of a previously sent operation; and sending (308), by the sequencing engine (208), the selected one of the set of operations (322) to the memory device (204).

The method of FIG. 7 differs from the method of FIG. 3, however, in that determining (304), by the sequencing engine (208), a targeted bank group of each of the set of operations (320) includes determining (702) a subset of the set of operations, wherein the subset of the set of operations each target bank groups that are different from the bank group targeted by the previously sent operation; and determining (704) a number of pending operations in the subset of the set of operations targeting each bank group.

Determining (702) a subset of the set of operations, wherein the subset of the set of operations each target bank groups that are different from the bank group targeted by the previously sent operation may be carried out by evaluating each bank group identifier in the set of operations and comparing part or all of the bank group identifier to the bank group identifier of the previously sent operation. The subset of the set of operations is created from the operations in the set of operations with bank group identifiers that do not match the bank group identifier of the previously sent operation.

Determining (704) a number of pending operations in the subset of the set of operations targeting each bank group may be carried out by tracking a total number of operations in the subset of operations that target each bank group. The sequencing engine (208) may maintain a running total of the number of operations targeting each bank group as operations are sent to the memory device (204) and as new operations are received and added to the set of operations.

The method of FIG. 7 also differs from the method of FIG. 3 in that selecting (306), by the sequencing engine (208), one of the set of operations based on the targeted bank group of each of the set of operations and a bank group of a previously sent operation includes selecting (706) one of the set of operations targeting a bank group with a number of pending operations higher than at least one other bank group. Selecting (706) one of the set of operations targeting a bank group with a number of pending operations higher than at least one other bank group may be carried out by comparing the pending operations for each bank group. The sequencing engine (208) may then determine which bank group has a high, or the highest, number of pending operations relative to the other bank groups. The sequencing engine (208) may then select an operation that targets the bank group with the highest number of pending operations, or a number of pending operations that is higher than at least one other targeted bank group.

For example, assume that the sequencing engine (208) tracks the number of pending requests for each of four bank groups ('00', '01', '10', and '11'), and that the previously sent operation targeted bank group '00'. In selecting a next operation, the sequencing engine (208) may determine a subset of operations that target bank groups '01', '10', and '11'. The sequencing engine (208) may determine which of the three bank groups has more pending operations than the other two, and select an operation targeting that bank group. If two bank groups both have the highest number of pending operations, then the sequencing engine (208) may select the oldest operation that targets one of the two bank groups.

Some or all of the bank group selection policies described above in FIGS. 4, 5, 6, and 7 may be combined together. For example, assume that during the current cycle four operations are ready to be sent to the memory device (204) (e.g., have met all timing constraints). Further, assume that each target a different bank group ('00', '01', '10', and '11'), and that the previously sent operation targeted bank group '00'. The sequencing engine (208) may first determine a subset of the set of operations that target bank groups that are different from the bank group targeted by the previously sent operation. The subset of operations would be made up of operations targeting bank groups '01', '10', and '11'. The sequencing engine may then select among the three remaining operations by selecting the operation targeting a bank group with the least number of active banks. If two or three of the operations target bank groups with the least and same number of active banks, then the oldest operation (or one of the oldest operations) may be selected.

Figure 8:
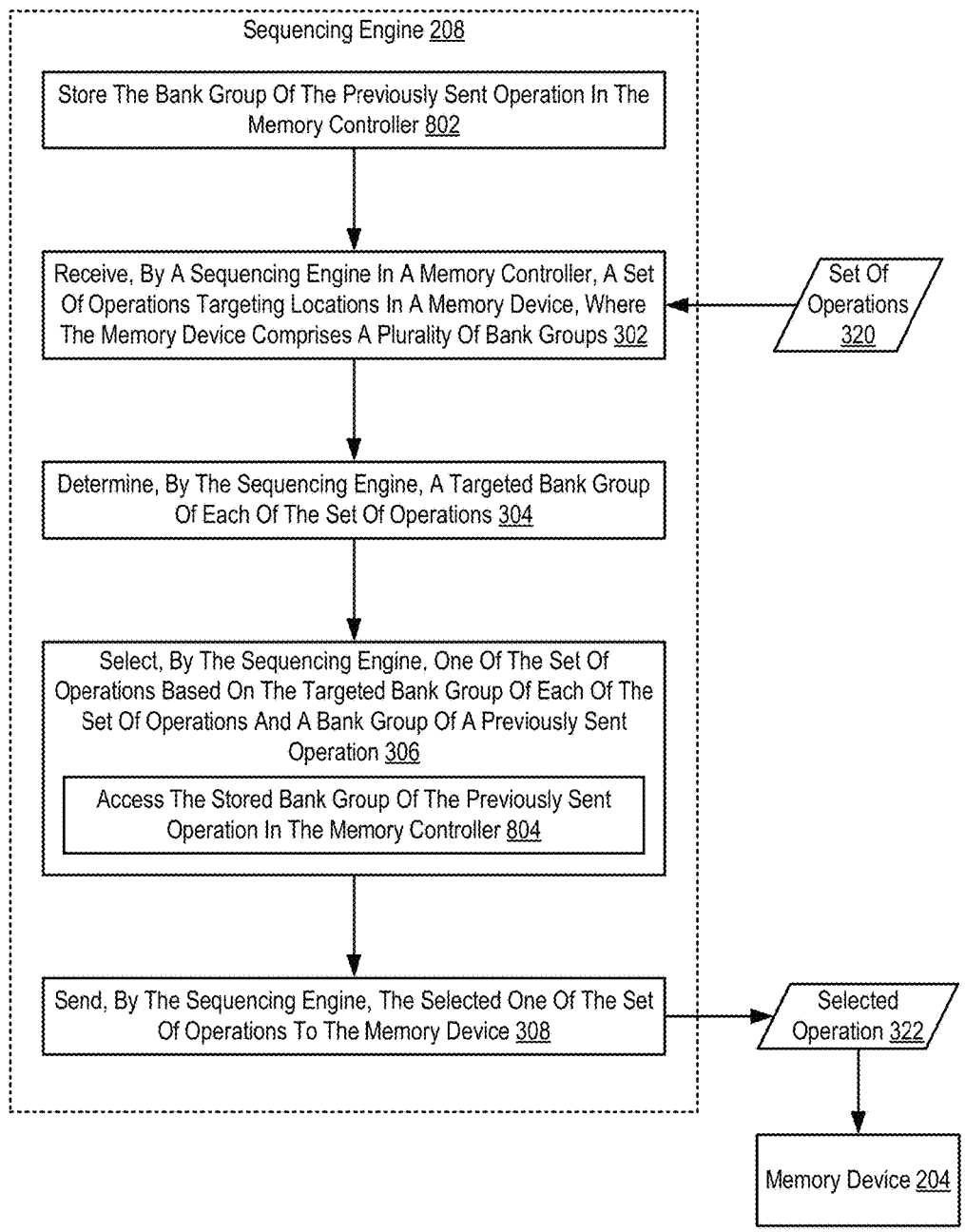
FIG. 8 sets forth a flow chart illustrating an exemplary method for scheduling memory operations using bank groups according to embodiments of the present invention.

For further explanation, FIG. 8 sets forth a flow chart illustrating a further exemplary method for scheduling memory operations using bank groups according to embodiments of the present invention that includes receiving (302), by a sequencing engine (208) in a memory controller, a set of operations (320) targeting locations in a memory device (204), wherein the memory device (204) comprises a plurality of bank groups; determining (304), by the sequencing engine (208), a targeted bank group of each of the set of operations (320); selecting (306), by the sequencing engine (208), one of the set of operations based on the targeted bank group of each of the set of operations and a bank group of a previously sent operation; and sending (308), by the sequencing engine (208), the selected one of the set of operations (322) to the memory device (204).

The method of FIG. 8 differs from the method of FIG. 3, however, in that the method of FIG. 8 further includes storing (802) the bank group of the previously sent operation in the memory controller. Storing (802) the bank group of the previously sent operation in the memory controller may be carried out by the sequencing engine (208) extracting the bank group identifier from the previously sent operation and storing that information in a location in the memory controller. The location in the memory controller may be embedded memory, such as a cache or register.

The method of FIG. 8 also differs from the method of FIG. 3 in that selecting (306), by the sequencing engine (208), one of the set of operations based on the targeted bank group of each of the set of operations and a bank group of a previously sent operation includes accessing (804) the stored bank group of the previously sent operation in the memory controller. Accessing (804) the stored bank group of the previously sent operation in the memory controller may be carried out by reading the location in the memory controller storing the bank group identifier of the previously sent operation.

In view of the explanations set forth above, readers will recognize that the benefits of scheduling memory operations using bank groups according to embodiments of the present invention include:
  Improving the operation of a computing system by selecting memory operations based on the applicable timing parameter, increasing computing system efficiency.
  Improving the operation of a computing system by varying the targeted bank groups of the operations sent to the memory device, increasing computing system efficiency.

Exemplary embodiments of the present invention are described largely in the context of a fully functional computer system for scheduling memory operations using bank groups. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of scheduling memory operations using bank groups, the method comprising:
    receiving, by a sequencing engine in a memory controller, a set of operations targeting locations in a memory device, wherein the memory device comprises a plurality of bank groups and the memory controller stores a bank group of a previously sent operation;
    determining, by the sequencing engine, a targeted bank group of each of the set of operations;

selecting, by the sequencing engine, one of the set of operations based on the targeted bank group of each of the set of operations and a bank group of a previously sent operation, including accessing the stored bank group of the previously sent operation in the memory controller; and sending, by the sequencing engine, the selected one of the set of operations to the memory device.

2. The method of claim 1, wherein selecting, by the sequencing engine, the one of the set of operations based on the targeted bank group of each of the set of operations and the bank group of the previously sent operation comprises determining that the one of the set of operations targets a different bank group from the bank group of the previously sent operation.

3. The method of claim 1, wherein determining, by the sequencing engine, the targeted bank group of each of the set of operations comprises determining a least significant bit of a bank group identifier of each of the set of operations, and
wherein selecting, by the sequencing engine, the one of the set of operations based on the targeted bank group of each of the set of operations and the bank group of the previously sent operation comprises determining that the bank group identifier least significant bit of the one of the set of operations is different than a bank group identifier least significant bit of the previously sent operation.

4. The method of claim 1, wherein determining, by the sequencing engine, the targeted bank group of each of the set of operations comprises:
determining a subset of the set of operations, wherein the subset of the set of operations each target bank groups that are different from the bank group targeted by the previously sent operation; and
determining a number of active banks in each of the bank groups targeted by each of the subset of the set of operations, and
wherein selecting, by the sequencing engine, the one of the set of operations based on the targeted bank group of each of the set of operations and the bank group of the previously sent operation comprises selecting one of the subset of the set of operations targeting a bank group with a number of active banks lower than at least one other bank group.

5. The method of claim 1, wherein determining, by the sequencing engine, the targeted bank group of each of the set of operations comprises:
determining a subset of the set of operations, wherein the subset of the set of operations each target bank groups that are different from the bank group targeted by the previously sent operation; and
determining a number of pending operations in the subset of the set of operations targeting each bank group, and
wherein selecting, by the sequencing engine, the one of the set of operations based on the targeted bank group of each of the set of operations and the bank group of the previously sent operation comprises selecting one of the set of operations targeting a bank group with a number of pending operations higher than at least one other bank group.

6. The method of claim 1, wherein the previously sent operation immediately precedes the selected one of the set of operations.

7. An apparatus for scheduling memory operations using bank groups, the apparatus comprising a computer processor, a computer memory operatively coupled to the computer processor, the computer memory having disposed within it computer program instructions that, when executed by the computer processor, cause the apparatus to carry out the steps of:
receiving, by a sequencing engine in a memory controller, a set of operations targeting locations in a memory device, wherein the memory device comprises a plurality of bank groups and the memory controller stores a bank group of a previously sent operation;
determining, by the sequencing engine, a targeted bank group of each of the set of operations;
selecting, by the sequencing engine, one of the set of operations based on the targeted bank group of each of the set of operations and a bank group of a previously sent operation, including accessing the stored bank group of the previously sent operation in the memory controller; and
sending, by the sequencing engine, the selected one of the set of operations to the memory device.

8. The apparatus of claim 7, wherein selecting, by the sequencing engine, the one of the set of operations based on the targeted bank group of each of the set of operations and the bank group of the previously sent operation comprises determining that the one of the set of operations targets a different bank group from the bank group of the previously sent operation.

9. The apparatus of claim 7, wherein determining, by the sequencing engine, the targeted bank group of each of the set of operations comprises determining a least significant bit of a bank group identifier of each of the set of operations, and
wherein selecting, by the sequencing engine, the one of the set of operations based on the targeted bank group of each of the set of operations and the bank group of the previously sent operation comprises determining that the bank group identifier least significant bit of the one of the set of operations is different than a bank group identifier least significant bit of the previously sent operation.

10. The apparatus of claim 7, wherein determining, by the sequencing engine, the targeted bank group of each of the set of operations comprises:
determining a subset of the set of operations, wherein the subset of the set of operations each target bank groups that are different from the bank group targeted by the previously sent operation; and
determining a number of active banks in each of the bank groups targeted by each of the subset of the set of operations, and
wherein selecting, by the sequencing engine, the one of the set of operations based on the targeted bank group of each of the set of operations and the bank group of the previously sent operation comprises selecting one of the subset of the set of operations targeting a bank group with a number of active banks lower than at least one other bank group.

11. The apparatus of claim 7, wherein determining, by the sequencing engine, the targeted bank group of each of the set of operations comprises:
determining a subset of the set of operations, wherein the subset of the set of operations each target bank groups that are different from the bank group targeted by the previously sent operation; and
determining a number of pending operations in the subset of the set of operations targeting each bank group, and
wherein selecting, by the sequencing engine, the one of the set of operations based on the targeted bank group of each of the set of operations and the bank group of the previously sent operation comprises selecting one of the set of operations targeting a bank group with a number of pending operations higher than at least one other bank group.

12. The apparatus of claim 7, wherein the previously sent operation immediately precedes the selected one of the set of operations.

13. A computer program product for scheduling memory operations using bank groups, the computer program product disposed upon a computer readable medium, the computer program product comprising computer program instructions that, when executed, cause a computer to carry out the steps of:

receiving, by a sequencing engine in a memory controller, a set of operations targeting locations in a memory device, wherein the memory device comprises a plurality of bank groups and the memory controller stores a bank group of a previously sent operation;

determining, by the sequencing engine, a targeted bank group of each of the set of operations;

selecting, by the sequencing engine, one of the set of operations based on the targeted bank group of each of the set of operations and a bank group of a previously sent operation, including accessing the stored bank group of the previously sent operation in the memory controller; and sending, by the sequencing engine, the selected one of the set of operations to the memory device.

14. The computer program product of claim 13, wherein selecting, by the sequencing engine, the one of the set of operations based on the targeted bank group of each of the set of operations and the bank group of the previously sent operation comprises determining that the one of the set of operations targets a different bank group from the bank group of the previously sent operation.

15. The computer program product of claim 13, wherein determining, by the sequencing engine, the targeted bank group of each of the set of operations comprises determining a least significant bit of a bank group identifier of each of the set of operations, and wherein selecting, by the sequencing engine, the one of the set of operations based on the targeted bank group of each of the set of operations and the bank group of the previously sent operation comprises determining that the bank group identifier least significant bit of the one of the set of operations is different than a bank group identifier least significant bit of the previously sent operation.

16. The computer program product of claim 13, wherein determining, by the sequencing engine, the targeted bank group of each of the set of operations comprises:

determining a subset of the set of operations, wherein the subset of the set of operations each target bank groups that are different from the bank group targeted by the previously sent operation; and determining a number of active banks in each of the bank groups targeted by each of the subset of the set of operations, and wherein selecting, by the sequencing engine, the one of the set of operations based on the targeted bank group of each of the set of operations and the bank group of the previously sent operation comprises selecting one of the subset of the set of operations targeting a bank group with a number of active banks lower than at least one other bank group.

17. The computer program product of claim 13, wherein determining, by the sequencing engine, the targeted bank group of each of the set of operations comprises:

determining a subset of the set of operations, wherein the subset of the set of operations each target bank groups that are different from the bank group targeted by the previously sent operation; and determining a number of pending operations in the subset of the set of operations targeting each bank group, and wherein selecting, by the sequencing engine, the one of the set of operations based on the targeted bank group of each of the set of operations and the bank group of the previously sent operation comprises selecting one of the set of operations targeting a bank group with a number of pending operations higher than at least one other bank group.

* * * * *